United States Patent [19]

Baum et al.

[11] Patent Number: 5,477,471
[45] Date of Patent: Dec. 19, 1995

[54] METHOD OF COMPENSATING FOR POWER SUPPLY VARIATION IN A SENSOR OUTPUT

[75] Inventors: Jeffery I. Baum, Scottsdale, Ariz.; William L. Lucas, Richmond, Va.

[73] Assignee: Motorola, Inc., Schaumburg, Ill.

[21] Appl. No.: 143,035

[22] Filed: Oct. 29, 1993

[51] Int. Cl.$^6$ .............................. G01L 25/00; G06F 11/00
[52] U.S. Cl. ................... 364/571.01; 364/571.05; 364/582; 324/609
[58] Field of Search ................... 364/571.01, 473.15, 364/571.02, 571.03, 571.04, 571.05, 582, 492; 330/285; 323/119, 211; 73/1 R, 1 B; 324/601, 602, 605, 607, 609, 610

[56] References Cited

U.S. PATENT DOCUMENTS

| | | | |
|---|---|---|---|
| 4,000,643 | 1/1977 | Pearson | 364/571.01 |
| 4,068,159 | 1/1978 | Gyugyi | 323/119 |
| 4,070,707 | 1/1978 | Barber | 364/414 |
| 4,335,361 | 6/1982 | Acker | 330/285 |
| 4,879,669 | 11/1989 | Kihara et al. | 364/571.01 |
| 4,949,289 | 8/1990 | Stephens et al. | 364/571.01 |
| 4,982,351 | 1/1991 | Kawate et al. | 364/571.01 |

*Primary Examiner*—Emanuel T. Voeltz
*Assistant Examiner*—M. Kemper
*Attorney, Agent, or Firm*—Robert D. Atkins

[57] ABSTRACT

A method compensates for power supply voltage variation in a sensor output. The sensor output voltage is calibrated by obtaining the sensor outputs for full-scale and minimum offset sensor input signals at two power supply settings. Linear plots are formed from the full-scale and offset sensor output voltages. The sensor input for each sensor output reading is computed by obtaining the power supply voltage at the time of the sensor output voltage reading. The full-scale and offset output voltages for that power supply voltage are computed from the slopes of the linear plots. Finally, the ratio of the difference between the output voltage and offset output voltage divided by the difference between the full-scale and offset output voltages is computed to provide the compensation factor. The product of the computed ratio and the value of the full-scale sensor input is the compensated sensor input value.

12 Claims, 3 Drawing Sheets

METHOD OF COMPENSATING FOR POWER SUPPLY VARIATION IN A SENSOR OUTPUT

The present invention relates in general to software engineering and, more particularly, to a method of compensating for power supply variation in a sensor output.

Sensors are commonly used for sensing a physical condition in an external environment, such as pressure and temperature, and providing a sensor output voltage that is proportional to the intensity of the sensor input. Typical applications include automotive pressure sensors, and temperature and pressure sensors in industrial environments. The sensor output voltage must be translated to a value representing the sensed physical condition. The accuracy with which the sensor output voltage represents the intensity of the physical condition depends in part on the precision of the power supply voltage.

In the prior art, in order to obtain high accuracy in the sensor output voltage a precision regulated power supply was necessary. The precision regulated power supply is rather expensive sensor option, and still the sensor output voltage is often subject to whatever variation remains in the power supply within its specifications.

Hence, a need exists for obtaining highly accurate sensor measurements of physical conditions from the sensor output voltage.

DETAILED DESCRIPTION OF THE PREFERRED EMBODIMENT

The present invention involves a method executed by a computer program for producing an accurate sensor output in the presence of sensor supply voltage variations and thus compensates for power supply variation in a sensor output. By sensing both the sensor output voltage and the supply voltage simultaneously via an analog-to-digital converter, a microcomputer can compute the true pressure independent of sensor supply voltage fluctuations. A software calibration scheme and a software algorithm executed with some computer hardware accurately calculate the sensor reading independent of supply voltage variations.

Figure 1:
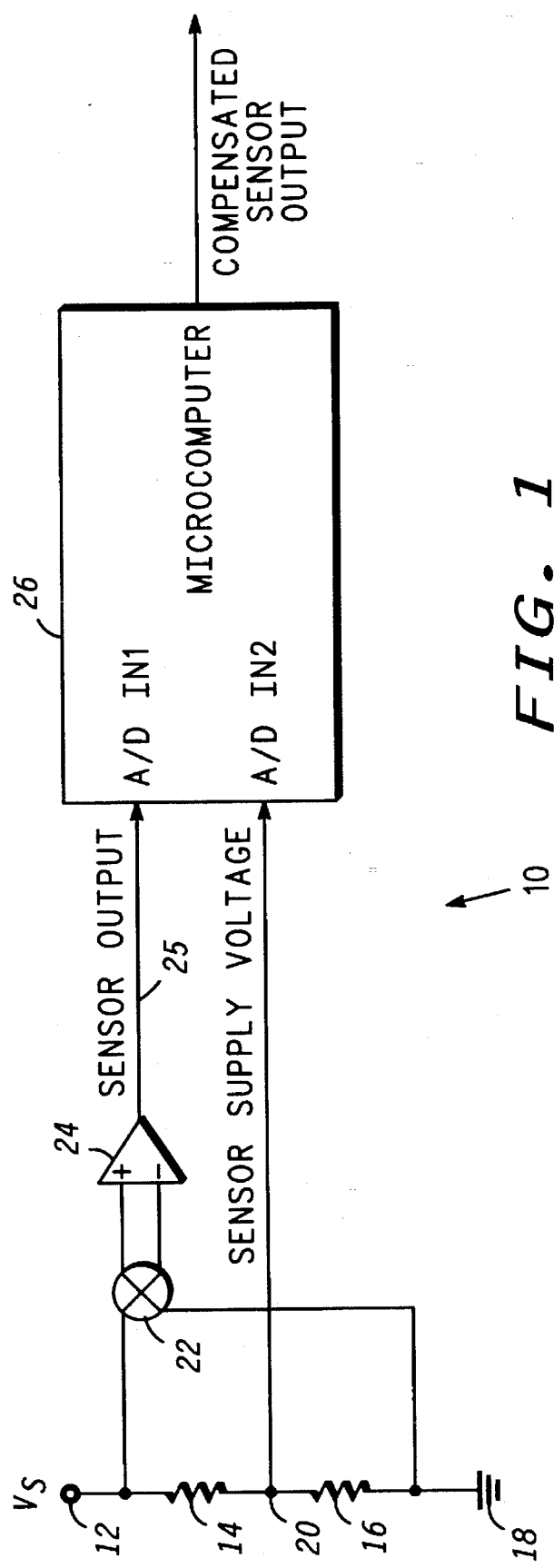
FIG. 1 is a block diagram illustrating a sensor circuit.

A sensing circuit 10 is shown in FIG. 1 suitable for interfacing a sensor 22 output and a scaled representation of its associated power supply voltage $V_S$ from power supply conductor 12 to microcomputer 26. Sensor 22 is coupled between power supply conductor 12 operating at a positive potential $V_S$ such as 12 volts and power supply conductor 18 operating at ground potential. First and second outputs of sensor 22 are coupled to non-inverting and inverting inputs of amplifier circuit 24. The amplified sensor output at node 25 is coupled to a first analog-to-digital converter input channel A/D IN1 of microcomputer 26. Resistors 14 and 16 are serially coupled between power supply conductor 12 and power supply conductor 18. The voltage divider formed by resistors 14 and 16 produces a sensor supply voltage at node 20 which is a linearly scaled representation of the power supply potential $V_S$ at power supply conductor 12. The sensor supply voltage at node 20 is coupled to a second analog-to-digital converter input channel A/D IN2 of microcomputer 26.

Figure 2:
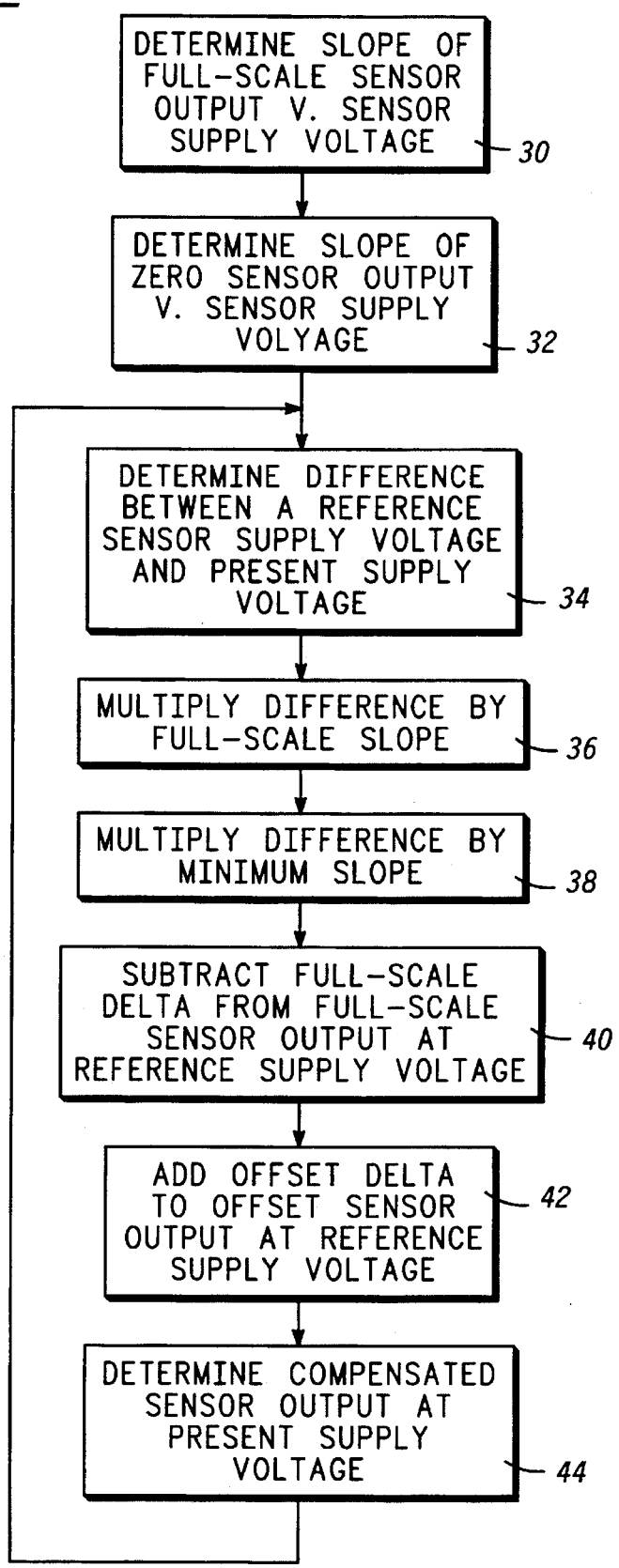
FIG. 2 illustrates a method of compensating for power supply variation in the sensor output of FIG. 1.

The above described circuit 10 operates in combination with the calibration procedure and the software algorithm described in FIG. 2. For the purposes of this description, the amplified sensor output voltage at node 25 is referred to as sensor output 25, while the attenuated power supply voltage at node 20 is referred to as sensor supply voltage 20.

In step 30 of the flowchart shown in FIG. 2, the slope of sensor output 25 at a first physical condition vs. sensor supply voltage 20 is calculated. In addition, the slope of sensor output 25 at second physical condition vs. sensor supply voltage 20 is computed in step 32. The first physical condition may represent one particular pressure, temperature, or any other measurable physical phenomena. For the purposes of the present explanation, the first physical condition is assumed to be a full-scale pressure, i.e. maximum pressure for system which sensor 22 can measure. The computation may be accomplished by storing the digital representations of sensor output 25 at the full-scale pressure and first and second sensor supply voltages 20 ($V_{S1}$ and $V_{S2}$), e.g. minimum and maximum operational power supply voltages, in the memory of microcomputer 26. The same information must be stored at the second physical condition, i.e. a minimum (zero) system pressure. The minimum pressure may be zero, or some small positive or negative offset value. The digital representations of the first and second sensor supply voltages $V_{S1}$ and $V_{S2}$ used in the calibration are also stored in memory of microcomputer 26.

Figure 3:
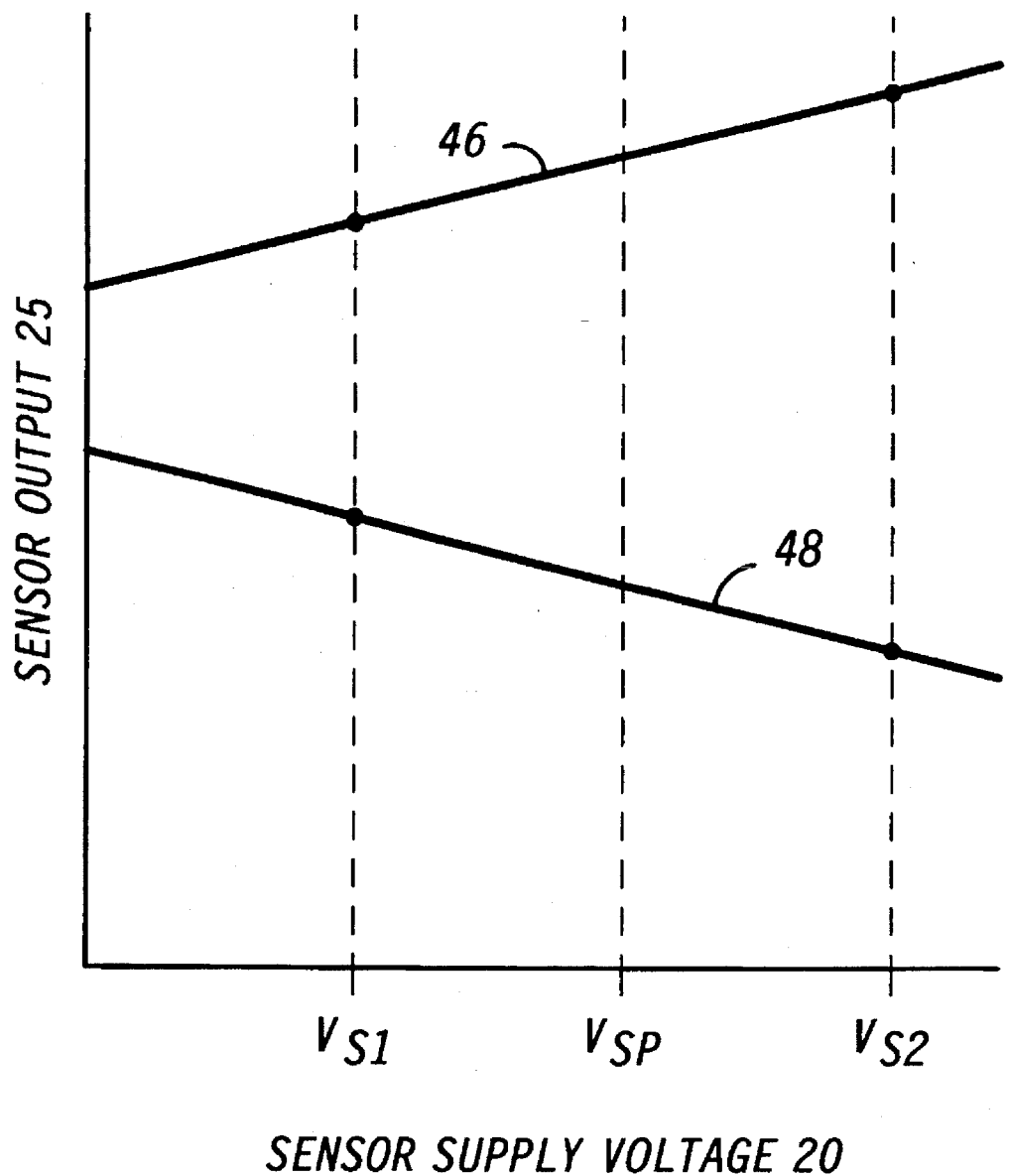
FIG. 3 is a plot that is useful in the explanation of the present invention.

Referring to FIG. 3, slope 46 represents the linear relationship between the full-scale sensor output 25 at the full-scale pressure between the first and second sensor supply voltages $V_{S1}$ and $V_{S2}$. Thus, slope 46 represents a range of full-scale sensor signals between the first and second sensor supply voltages $V_{S1}$ and $V_{S2}$. Likewise, slope 48 represents the linear relationship between the minimum sensor output 25 at the second physical condition between the first and second sensor supply voltage $V_{S1}$ and $V_{S2}$. Thus, slope 48 represents a range of minimum (offset) sensor signals between the first and second sensor supply voltages $V_{S1}$ and $V_{S2}$.

As stated, the digital values of sensor output 25 at the full-scale pressure and first and second sensor supply voltages $V_{S1}$ and $V_{S2}$ are sensed via the analog-to-digital converter input channels A/D IN1 and A/D IN2 of microcomputer 26 and stored in its memory. After applying the minimum pressure to sensor 22, the digital values of sensor output 25 at the minimum pressure and the first and second sensor supply voltages $V_{S1}$ and $V_{S2}$ are sensed via the analog-to-digital converter input channels A/D IN1 and A/D IN2 of microcomputer 26 and stored in its memory. With the above information stored in memory, the slopes 46 and 48 can be computed by taking the difference of sensor outputs 25 at the first and second sensor supply voltages $V_{S1}$ and $V_{S2}$ divided by the difference between the values of the minimum and maximum sensor supply voltages $V_{S1}$ and $V_{S2}$. This same calculation is performed at the full-scale pressure and the minimum (offset) pressure conditions to yield slopes 46 and 48, respectively. Thus, steps 30 and 32 comprise a calibration procedure to derive slopes 46 and 48.

Once the aforedescribed calibration procedure has calculated the slopes 46 and 48 that represent sensor output 25 vs. sensor supply voltage 20 at the first and second physical conditions, the following software algorithm produces the correct sensor output at any given sensor supply voltage and physical condition. For the purpose of describing the algorithm outlined in FIG. 2, the sensor is assumed to be a pressure transducer and the first and second physical conditions are the application of full-scale pressure and minimum pressure to sensor 22, respectively. The minimum pressure represents an offset signal.

Assume sensor 22 measures any arbitrary present physical condition of the system and provides a present sensor output 25 accordingly. Further assume the present power supply voltage during present physical condition of the system produces a present sensor supply voltage at node 20 with value $V_{SP}$. First, the difference between a reference sensor supply voltage 20, e.g. maximum supply voltage $V_{S2}$ used during calibration, and the present sensor supply voltage 20 ($V_{SP}$) is determined in step 34. The sensor supply voltage difference is multiplied by slope 46 representing the full-scale sensor output 25 vs. sensor supply voltage 20 to produce a full-scale delta in step 36. The sensor supply voltage difference is also multiplied by slope 48 representing the minimum sensor output 25 vs. sensor supply voltage 20 to produce an offset delta in step 38. The full-scale delta is subtracted from the full-scale sensor output 25 that was stored at the reference supply voltage $V_{S2}$ to produce the present full-scale sensor output 25 at the present sensor supply voltage 20 in step 40. The offset delta is added to the minimum sensor output that was stored at the reference sensor supply voltage $V_{S2}$ to produce the present offset sensor output at the present sensor supply voltage in step 42. Note that this example assumes that a pressure sensor with a negative slope of its sensor output at minimum pressure vs. sensor supply voltage is used. For a pressure sensor with a positive sensor output at minimum pressure vs. sensor supply voltage characteristic, the offset delta would be subtracted from the minimum sensor output that was stored at the reference sensor supply voltage $V_{S2}$ to produce the present offset sensor output at the present sensor supply voltage.

The final step 44 determines the compensated pressure at the present supply voltage. The present offset sensor output is subtracted from the present sensor output at the present sensor output in step 44. This difference is divided by the difference between the calculated present sensor output at full-scale pressure and the calculated present offset sensor output at minimum pressure. The resultant ratio is multiplied by a full-scale span in desired engineering units, e.g. kPa, that was defined at calibration time to read and store calibration data corresponding to the applied pressure at the present sensor supply voltage. The full-scale span represents the difference between slope 46 and slope 48 at any supply voltage. Thus, the compensation for power supply variation in the sensor output signal is calculated by taking a product of the full-scale span and a percent of full-scale determined by the present sensor output signal less the present offset sensor output divided by the full-scale sensor output less the offset sensor output. By calculating the correct pressure for the present sensor supply voltage, the sensor output voltage has thus been compensated for variations in sensor supply voltage. In other words, a computer method for compensating the effects of sensor supply voltage variations has been implemented.

While specific embodiments of the present invention have been shown and described, further modifications and improvements will occur to those skilled in the art. It is understood that the invention is not limited to the particular forms shown and it is intended for the appended claims to cover all modifications which do not depart from the spirit and scope of this invention.

What is claimed is:

1. A computer implemented method of compensating for power supply variation in a sensor output, comprising the steps of:

providing a range of offset signals between minimum and maximum supply voltages where said offset signals represent a first state of a physical condition over said minimum and maximum supply voltages;

providing a range of full-scale signals between said minimum and maximum supply voltages where said full-scale signals represent a second state of said physical condition over said minimum and maximum supply voltages;

sensing a sensor output signal from the sensor output operating at a first supply voltage between said minimum and maximum supply voltages in response to a third state of said physical condition between said first and second states of said physical condition;

selecting a first offset signal at said first supply voltage from said range of offset signals;

selecting a first full-scale signal at said first supply voltage from said range of full-scale signals; and compensating for the power supply variation in said sensor output signal by normalizing said sensor output signal less said first offset signal by said first full-scale signal less said first offset signal where said normalizing transforms said sensor output signal into a sensor signal that operates independent of the power supply.

2. The method of claim 1 further including the steps of:

sensing a first sensor output voltage operating at said minimum supply voltage under a minimum physical condition;

sensing a second sensor output voltage operating at said maximum supply voltage under said minimum physical condition; and establishing said range of offset signals by calculating an offset slope of sensor output voltages between said minimum and maximum supply voltages based on said minimum physical condition.

3. The method of claim 2 further including the steps of:

sensing a third sensor output voltage operating at said minimum supply voltage under a maximum physical condition;

sensing a fourth sensor output voltage operating at said maximum supply voltage under said maximum physical condition; and establishing said range of full-scale signals by calculating a full-scale slope of sensor output voltages between said minimum and maximum supply voltages based on said maximum physical condition.

4. The method of claim 1 further including the step of computing a difference between a reference supply voltage and said first supply voltage for providing a difference signal.

5. The method of claim 4 wherein said step of determining an offset signal including the steps of:

multiplying said difference signal by said offset slope for providing an offset delta; and adding said offset delta to an offset signal at said reference supply voltage.

6. The method of claim 5 wherein said step of determining a full-scale signal including the steps of:

multiplying said difference signal by said full-scale slope for providing a full-scale delta; and subtracting said full-scale delta from a full-scale signal at said reference supply voltage.

7. A computer implemented method of compensating for power supply variation in a sensor output, comprising the steps of:

establishing a range of offset signals between said minimum and maximum supply voltages based on a minimum pressure;

establishing a range of full-scale signals between said minimum and maximum supply voltages based on a maximum pressure;

sensing a sensor output signal from the sensor output operating at a first supply voltage in response to a first operating pressure;

selecting a first offset signal at said first supply voltage from said range of offset signals;

selecting a first full-scale signal at Said first supply voltage from said range of full-scale signals; and compensating for the power supply variation in said sensor output signal by normalizing said sensor output signal less said first offset signal by said first full-scale signal less said first offset signal said normalizing transforms said sensor output signal into a sensor signal that operates independent of the power supply voltage.

8. The method of claim 7 further including the steps of:

sensing a first sensor output voltage operating at a minimum supply voltage under a minimum physical condition;

sensing a second sensor output voltage operating at a maximum supply voltage under said minimum physical condition;

establishing said range of offset signals by calculating an offset slope of sensor output voltages between said minimum and maximum supply voltages based on said minimum physical condition.

9. The method of claim 8 further including the steps of:

sensing a third sensor output voltage operating at said minimum supply voltage under a maximum physical condition;

sensing a fourth sensor output voltage operating at said maximum supply voltage under said maximum physical condition; and establishing said range of full-scale signals by calculating a full-scale slope of sensor output voltages between said minimum and maximum supply voltages based on said maximum physical condition.

10. The method of claims 8 further including the step of computing a difference between a reference supply voltage and said first supply voltage for providing a difference signal.

11. The method of claim 10 wherein said step of determining an offset signal including the steps of:

multiplying said difference signal by said offset slope for providing an offset delta; and adding said offset delta to an offset signal at said reference supply voltage.

12. The method of claim 11 wherein said step of determining a full-scale signal including the steps of:

multiplying said difference signal by said full-scale slope for providing a full-scale delta; and subtracting said full-scale delta from a full-scale signal at said reference supply voltage.

* * * * *